Aug. 10, 1948.  E. P. LACURE  2,446,704
END CLIP ASSEMBLY
Filed June 13, 1946  4 Sheets-Sheet 1
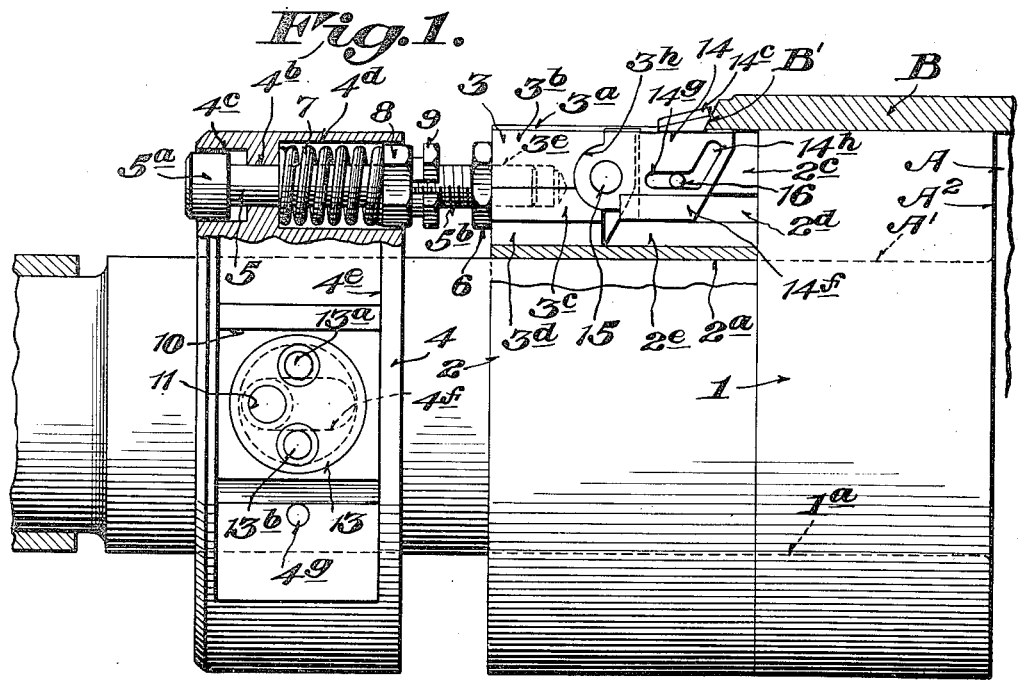
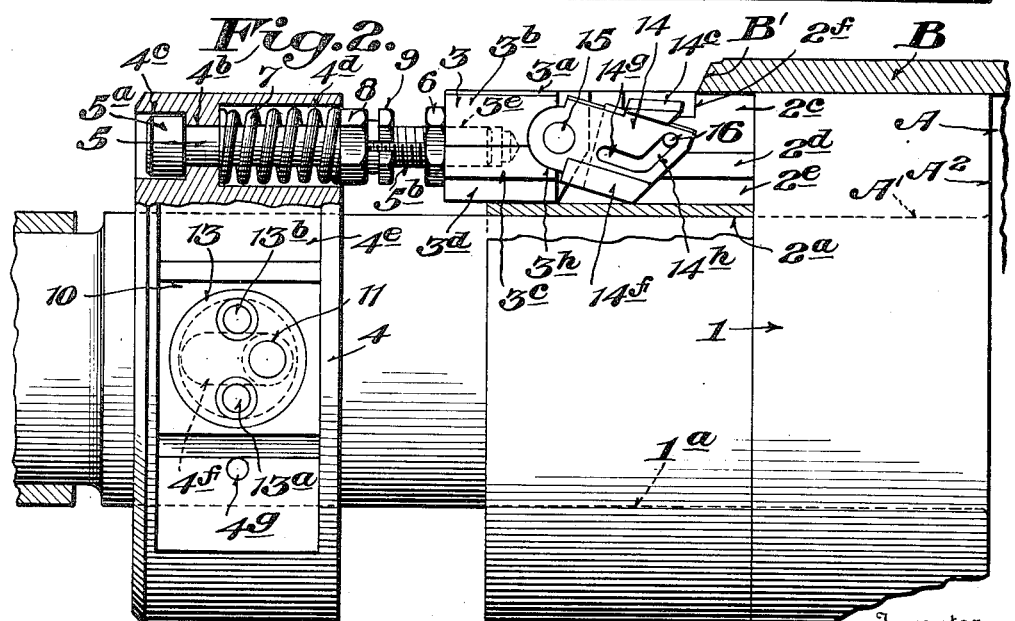
Inventor
Earl P. Lacure
By Alexander &. Dell
Attorneys Aug. 10, 1948.   E. P. LACURE   2,446,704
END CLIP ASSEMBLY
Filed June 13, 1946   4 Sheets-Sheet 2
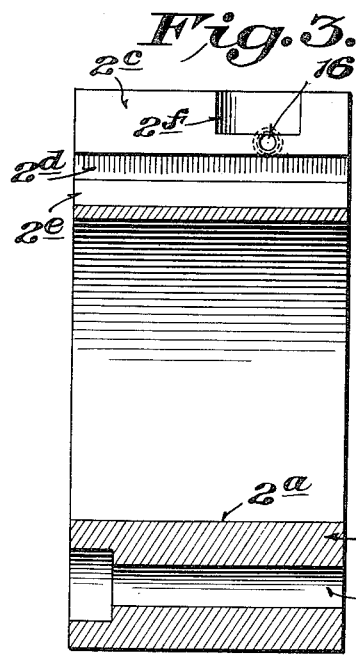
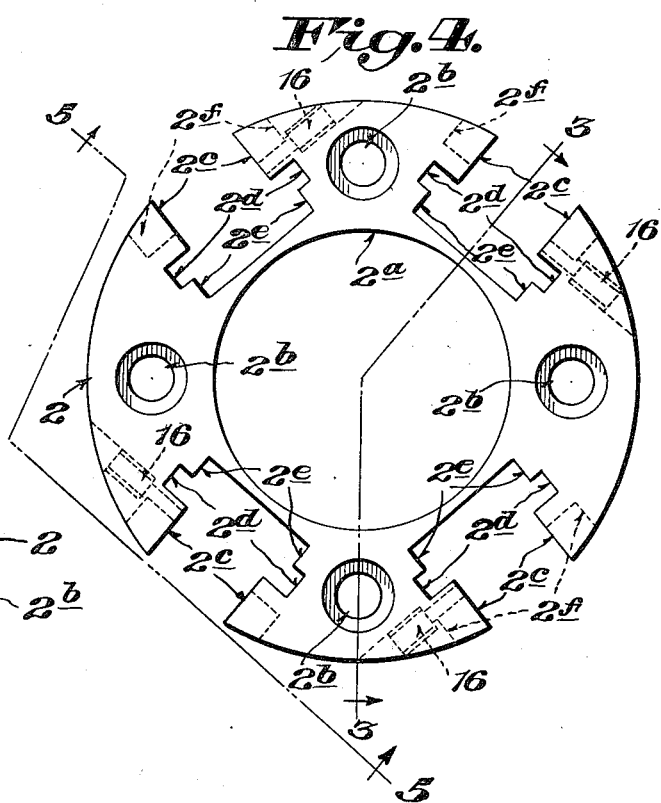
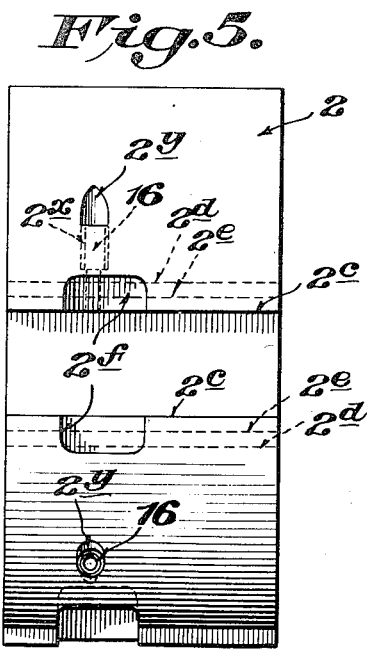
Inventor
Earl P. Lacure
By Alexander Dowell
Attorneys

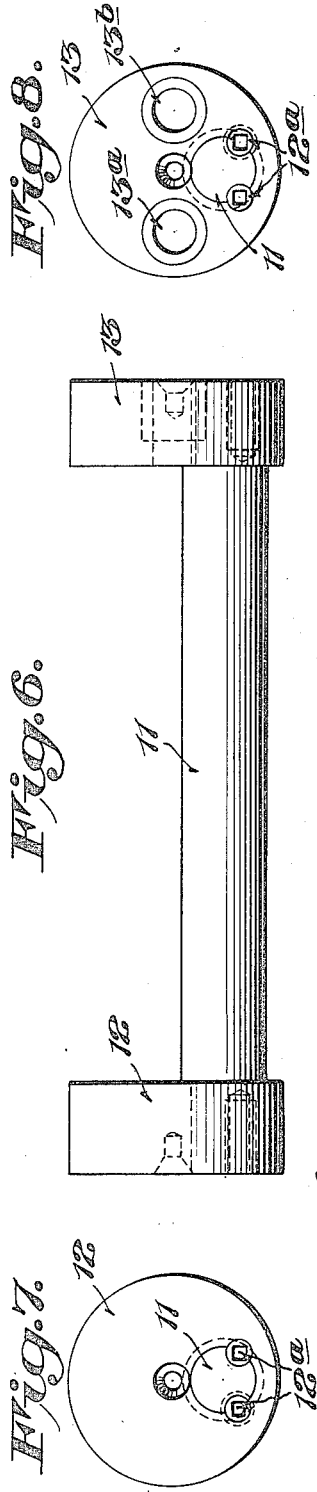

Aug. 10, 1948.  E. P. LACURE  2,446,704
END CLIP ASSEMBLY
Filed June 13, 1946  4 Sheets-Sheet 4

Inventor
Earl P. Lacure
By
Attorneys

Patented Aug. 10, 1948

2,446,704

UNITED STATES PATENT OFFICE 2,446,704

END CLIP ASSEMBLY

Earl P. Lacure, Battle Creek, Mich., assignor, by mesne assignments, to Goss Printing Press Company, Chicago, Ill., a corporation of Illinois Application June 13, 1946, Serial No. 676,533

16 Claims. (Cl. 101—378)

This invention is a novel end clip assembly for clamping tubular stereotype printing plates on plate cylinders of printing presses or the like, the same being an improvement upon the clamping means of the general type shown in U. S. Letters Patent #2,350,585, issued June 6, 1944, and U. S. Letters Patent #2,236,146, issued March 25, 1941, and the principal object of my present invention is to prepare a simple, positive, and efficient clamping means embodying novel features of construction and arrangement of parts hereinafter set forth.

Further objects and advantages of the invention will appear as the description proceeds.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:

Figure 1 is a side elevation, partly in section, of a plate cylinder provided with my novel clamping means, showing the clamps in extended position to engage the tubular plate on the cylinder.

Figure 2 is a view similar to Figure 1 but showing the clamping means shifted into retracted position to disengage the plate.

Figure 3 is a vertical section on the line 3—3, Figure 4, through the clip collar forming part of my clamping means.

Figure 4 is an end view of the clip collar shown in Figure 3.

Figure 5 is a side elevation of the clip collar taken along the line 5—5, Figure 4.

Figure 6 is a plan view of the cam shaft forming part of my clamping means.

Figure 7 is one end view of the cam shaft shown in Figure 6.

Figure 8 is an end view of the opposite cam on the cam shaft shown in Figure 6.

Figure 9 is a side elevation of a clip slide forming part of my clamping means.

Figure 10 is a top plan view of the clip slide shown in Figure 9.

Figure 11 is an end view of the clip slide shown in Figure 9.

Figure 12 is a side elevation of a plate clip used with the clip slide.

Figure 13 is a top plan view of the plate clip shown in Figure 12.

Figure 14 is an end view of the plate clip shown in Figure 12.

Figure 19 is a front view of the cam shoe forming part of my clamping means.

Figure 20 is a side view of the cam shoe shown in Figure 19.

As shown in Figures 1 and 2, the plate cylinder A of the printing press is adapted to hold a tubular stereotype printing plate B of substantially tubular form having a beveled end B' in the usual manner, the plate cylinder A slidably supporting the plate B which usually extends more than half-way around the circumference of cylinder A so that the plate B must necessarily be slipped over an end of the cylinder A when placing or removing the plate B therefrom. The opposite end of the plate cylinder (not shown) is provided with the usual fixed plate-engaging devices while the clamping end of the cylinder A, shown in Figures 1 and 2, is provided with an annular series of spaced plate-engaging clips adapted to be shifted to engage the beveled edge B' of plate B, said series of clips being actuated by a single shift collar whereby the series of plate clips may be simultaneously projected into plate-clamping position, or simultaneously retracted below the plate supporting surface of cylinder A, so as to permit the stereotype plate B to be readily inserted or removed endwise from cylinder A by slipping same over the clamping end of the cylinder when the clips are retracted.

Figure 17:
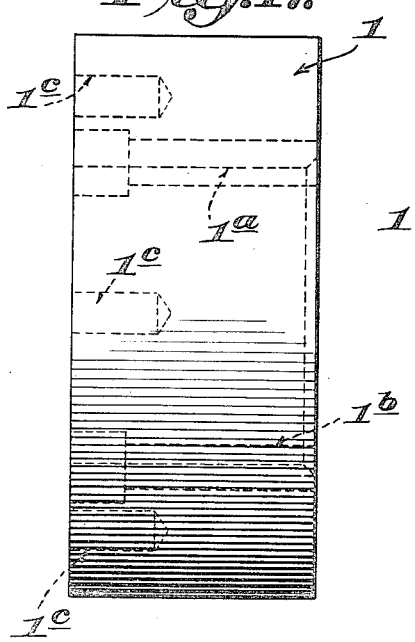
Figure 17 is a side elevation of the spacer used on the plate cylinder.
Figure 18:
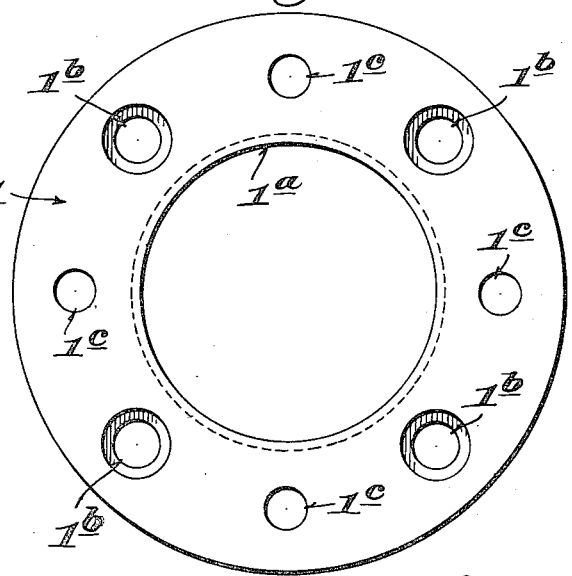
Figure 18 is an end view of the spacer shown in Figure 17.

The main portion of plate cylinder A forms a direct supporting surface in contact with the tubular stereotype plate B, but the clamping end of cylinder A is reduced as at A' to permit installation of my plate-clamping mechanism, thereby providing a squared shoulder A2 between the portion A' and the main body of the cylinder. The beveled end of plate B overlaps the shoulder A2 of plate cylinder A, and on the reduced portion A' below the plate is a spacer I, of cylindrical form, shown more particularly in Figures 17 and 18, the same having a bore Ia adapted to slidably engage the reduced portion A' of plate cylinder A and having an exterior diameter equal to that of the main portion of the cylinder A.

Spacer I is of less length than the overlapping portion of the plate B, as shown in Figures 1 and 2, and is provided with four holes Ib passing therethrough (Figures 17 and 18) which are preferably countersunk, for the reception of bolts (not shown), whereby spacer 1 may be securely bolted to the shoulder A2 of cylinder A. Spacer 1 is further provided with tapped bores 1c, evenly spaced apart, for the reception of cap screws or the like, which secure the clip collar 2, hereinafter described, in position on the reduced portion A' with respect to the spacer 1. The use of a spacer as noted makes possible the use of a correspondingly shorter spacer when a slightly shorter plate B is to be used for printing. In that case either longer bolts 5 would be used, or if the plate length reduction is small then bolts 5 can be backed out of threaded opening 3e a corresponding amount and locked in place by means of lock nut 6.

On the reduced portion A', contacting and underlying the beveled edge B' of plate B, is a clip collar 2 shown more particularly in Figures 3, 4 and 5, the same being of general cylindrical shape, having a bore 2a making a sliding fit on the reduced portion A' of plate cylinder A, the clip collar 2 having bores 2b extending therethrough for the reception of bolts or cap screws (not shown) which pass through the bores 2b into the threaded bores 1c of spacer 1, to securely lock the clip collar 2 to the spacer 1 and hence to the plate cylinder A.

Alternating with the holes 2b in clip collar 2 are a series of peripheral guide slots, four being shown, but obviously the number may be increased or decreased as desired, depending upon the size of the collar. As shown, each of the guide slots is formed with outer parallel walls 2c (Figures 3, 4, 5) extending inwardly from the outer surface of collar 2 throughout the full length of the clip collar, said walls 2c terminating in undercut portions 2d which are preferably straight-sided and which increase the width of the guide slots, the walls below the undercut portions 2d being parallel and reduced in width, as at 2e, the cross-sectional shape of the guide slots 2c, 2d, 2e conforming with the cross-sectional shape of the clip slides 3, hereinafter described.

Within each of the guide slots 2c, 2d, 2e is a clip slide 3, shown more particularly in Figures 9, 10 and 11, the same having a cross-sectional shape corresponding to but slightly smaller than the said guide slots in which same slide. Each clip slide 3 is of the same height as the depth of the slots 2c, 2d, 2e but has an arcuate outer face 3a (Figure 11), conforming with the curvature of the main portion of the plate cylinder A. Each slide 3 has its upper side walls 3b slidably fitting the parallel outer walls 2c of the guide slots, and has lateral enlargements 3c below the walls 3b to engage the undercut portions 2d of the guide slots, the lower portion of each slide 3 being reduced as at 3d to engage the lower portion 2e of the guide slot.

In the outer end of each clip slide 3 is a tapped hole 3e adapted to receive a shifting bolt, hereinafter described. The inner end of each clip slide 3 is reduced in thickness as at 3f and is provided with a transverse bore 3g for a pivot pin hereinafter described, which connects the plate clip 14 to the related clip slides 3, the adjacent end of the wider portions 3b, 3c of the clip 3 being semi-circularly recessed, as at 3h, coaxially with the bore 3g so as to provide clearance for the interfitting ears of the plate clip 14 hereinafter described.

Figure 15:
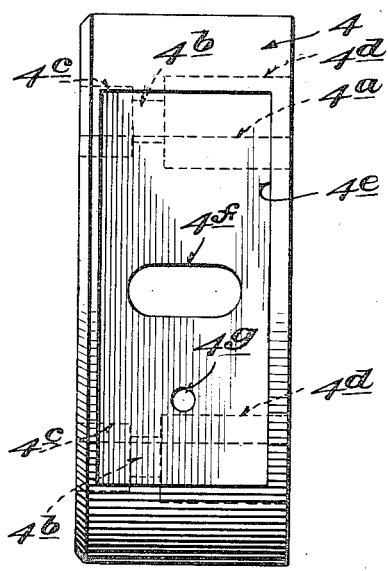
Figure 15 is a side elevation of the shift collar forming part of my clamping means.
Figure 16:
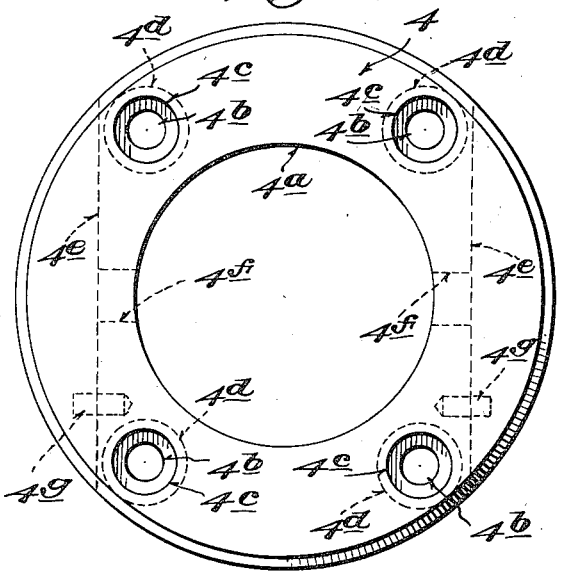
Figure 16 is an end view of the shift collar.

As previously stated, the clip slides 3 are adapted to be simultaneously moved within the guide slots 2c, 2d, 2e, and for this purpose a shift collar 4 is slidably mounted on the reduced portion A' of cylinder A, said shift collar being of cylindrical shape as shown more particularly in Figures 15, 16, same having a bore 4a making a sliding fit upon the reduced portion A' and the outer diameter of shift collar 4 being of slightly less diameter than the main portion of plate cylinder A. Adjacent the periphery of shift collar 4 are a series of bores 4b opposite each of the clip slides 3, said bores having enlarged outer ends 4c, and enlarged inner ends 4d. Extending through each of the aligned bores 4b, 4c, 4d are bolts 5 having enlarged heads 5a housed within the enlarged outer bores 4c, said bolts 5 being threaded as at 5b and entering the tapped holes 3e of the related clip slides 3, lock nuts 6 carried by bolts 5 engaging the outer faces of said clip slides.

Within the enlarged bores 4d are spiral springs which are mounted on bolts 5 and which engage the inner ends of said bores 4d and nuts 8 carried by the bolts 5, the position of the nuts 8 determining the compression of the springs 7 which springs 7 normally urge the bolts 5 in a direction tending to cause their heads 5a to seat at the inner ends of the outer bores 4c. Nuts 8 are retained in adjusted position by lock nuts 9 of any desired form. The bolts 5 are thus permitted to yield in their bores 4c, 4d, 4b for the purpose hereinafter described.

At diametrically opposite sides, the shift collar 4 is peripherally flattened as at 4e, the flattened portions 4e terminating within the ends of the shift collar to form guides for cam shoes 10 (Figures 19 and 20), adapted to be shifted upwardly or downwardly in the guides 4e. Disposed centrally of each of the guides 4e is an elongated longitudinal slot 4f communicating with the bore 4a, and a cam shaft 11 (Figures 6, 7, 8) extends through a transverse circular bore closely but freely fitting same in the reduced portion A', and through each of the slots 4f of the shift collar 4, said cam shaft carrying at one end an eccentric circular cam 12 (Figure 7) locked thereto by means of removable socket head threaded pins 12a which facilitate assembly and disassembly of the cams on the cam shaft, cam 12 engaging a circular recess in its related cam shoe 10, while at the other end of cam shaft 11 is an eccentric circular cam 13 of same size as the cam 12, the cam 13 engaging a circular recess in its related cam shoe 10. Both cams 12 and 13 are disposed at the same angular relation with respect to the shaft 11, and hence as the cam shaft 11 is rotated, by means of a spanner wrench or the like engaging holes 13a—13b in one of the cams, such as 13, the eccentricity of the cams with respect to the fixed shaft 11 will cause the shift collar 4 to be axially shifted on the reduced portion A' of the plate cylinder A from the position shown in Figure 1 wherein the shift collar 4 is shown shifted its maximum permitted extent towards the clip collar 2, to the position shown in Figure 2 wherein the shift collar 4 is shown shifted in maximum permitted extent away from the clip collar 2, the movement of the shift collar 4 carrying with it the clip slides 3 which move in unison therewith but which are permitted a slight individual yieldability with respect thereto because of the provision of the springs 7 around the bolts 5. Pin 4g in shift collar 4 acts as a stop for cam shoe 10, and is so located that cams 12 and 13 can be turned slightly past dead center in both directions to lock shift collar 4 in either extended or retracted position.

Pivotally connected with each of the clip slides 3 is a plate clip 14 shown more particularly in Figures 12, 13, 14, each plate clip 14 having spaced ears 14a at its outer end adjacent the clip slides 3, which ears are perforated as at 14b and adapted to straddle the reduced end wall 3f of the related clip slide 3, the ears 14a fitting within the semicircular recesses 3h of the clip slides 3. Pivot pins 15 pass through the bores 14b of the ears 14a and through the bore 3g of the clip slide 3 whereby the plate clips 14 are permitted a limited swinging motion with respect to their related clip slides 3 radially of their related slots 2c, 2d, 2e of the clip collar 2.

At the top of each plate clip 14 is an inclined locking lug 14c which is wider than the portion 2c of the slot in clip collar 2 to the extent of the overhanging ears 14k, so that the body of the locking lug 14c may be retracted within the portion 2c of the slot and the ears 14k into recesses 2f, as shown in Figure 2. This makes possible the use of a relatively wide face locking lug adapted to grip the edge of plate B much more firmly than would be the case if the locking lug was limited in width to that of portion 2c of the slot. Preferably the locking lug 14c slopes downwardly and outwardly towards the ears 14a, as clearly shown in Figures 1 and 2, and the forward edge 14e thereof is provided with vertical serrations as shown in Figure 14 to firmly grip the beveled edge B' of the stereotype plate B when the plate clips 14 are in raised locking position shown in Figure 1. Also, the upper face of the locking lug 14c is preferably arcuate, as shown in Figure 14, the same conforming with the general curvature of the plate cylinder A.

The lower end of each plate clip 14 is enlarged as at 14f to form a shoulder which is of a width adapted to slidably fit within the lower portion 2e of the slot 2c, 2d, 2e in clip collar 2, when in either the retracted or the elevated positions shown in Figures 2 and 3. The upper face of shoulders 14f is adapted to rest in elevated position against the shoulders joining the side faces of portions 2c and 2d of clip collar 2. This holds the plate clip 14 from climbing up the sloping end of plate B when gripping pressure is applied. At one side of the plate clip 14 is a slot having a horizontal portion 14g adjacent the ears 14a, the forward end of the slot being upwardly inclined as at 14h and adapted to engage a fixed pin 16 extending inwardly from the wall 2c of the slot in the clip collar 2, said pin riding in the slots 14g and 14h, whereby, as the clip 14 is shifted towards the stereotype plate B, the same will be elevated by the pin 16 engaging inclined slot 14h before contacting the beveled edge B' of plate B, but when the clip 14 is shifted in the opposite direction the clips 14 will be retracted within the slots 2c, 2d, 2e, and recesses 2f out of engagement with the beveled edge B' of plate B.

Each pin 16 preferably comprises an Allen set screw having a threaded outer end tapped through a bore 2x (Figure 5) extending through the wall of clip collar 2 disposed at right angles to the wall 2c of the slot 2c, 2d, 2e therein, the entrance to the bore 2x being cut away as at 2y so as to permit insertion of the pin 16. The inner end of pin 16 is not threaded but directly engages the slot 14g, 14h of the related plate clip 14.

*In operation*

When it is desired to mount or remove a stereotype plate B from the cylinder A, a spanner wrench is applied to the holes 13a, 13b in the face of cam 13 and the cams 12, 13 rotated to shift the shift collar 4 just past dead center into its extreme left-hand position shown in Figure 2, whereupon all the plate clips 14 will be simultaneously retracted within the walls 2c, 2d, 2e, and recesses 2f of the slots in clip collar 2, and the plate B can be removed endwise from cylinder A over the collars 2 and 4 and the parts carried thereby, or a new plate B slipped endwise over the end of the cylinder A until it engages the fixed stops at the opposite end of the cylinder. When so positioned, the spanner wrench is again applied to the holes 13a, 13b of cam 13 and the cams 12, 13 thereby rotated to shift the collar 4 just past dead center into the extreme right-hand position as shown in Figure 1, thereby shifting the clip slides 3 towards the plate B and causing the fixed pins 16 to initially raise the related plate clips 14 into clamping position, due to their engagement with the inclined slots 14h, and subsequently to maintain the clips in clamping position until same yieldably engage the beveled edge B' of the plate B shown in Figure 1. Any inequalities at the edge B' of the plate will be compensated for the spring 7 around the bolts 5, thus permitting each of the clips to engage the beveled edge B' of the plate B with substantially the same pressure.

Since the cam shaft 11 passes entirely through a suitable circular bore in the reduced portion A' of the cylinder A and has the cams 12, 13 on its outer ends, it is obvious that the whole end clip assembly is readily operable for positive locking and unlocking of the plate merely by the use of a spanner wrench (not shown) engaging the two holes 13a, 13b in cam 13.

I do not limit my invention to the exact form shown in the drawings for obviously changes may be made therein within the scope of the claims.

I claim:

1. An end clip assembly for clamping a tubular stereotype printing plate on a plate cylinder having a reduced end portion overlapped by an end of the said plate, comprising a clip collar on the reduced portion underlying the end of the plate and secured to the cylinder, said clip collar having a series of spaced longitudinally extending slots in its periphery having undercut enlargements adjacent their lower ends; slides in the respective slots of cross-sectional shape corresponding with that of the slots; means for simultaneously shifting the slides in the slots; plate clips in the slots pivotally connected to the inner ends of their related slides and having plate engaging lugs adapted in one position to engage the edge of the plate and in another position to be retracted within the slots; and cam means in the slots adapted to project the clips outwardly of the slots when the clips are shifted towards the plate and to retract the clips within the slots when shifted away from the plate, each slot in the clip collar having an outer parallel walled portion with a pair of oppositely located, sidewise extending, recesses in the upper portion of same, and having an inner parallel walled portion of greater width than the outer portion, and having an intermediate parallel walled portion of greater width than that of the inner portion; each slide having its inner end reduced in width and provided with a transverse bore; and each clip being of less height than the depth of the slot and having spaced perforated ears at its outer end straddling the reduced end of the related slide, a pivot pin passing through said ears and the bore of the slide, the plate engaging lug thereof being wider than the outer walled portion of the slot in the clip collar but of less width than said sidewise extending recesses in the upper portion of same and into which the ends of said lug are adapted to be completely retracted, said lug having an arcuate inner edge conforming with the curvature of the plate, the lower portion of the clip being of less width than the inner walled portion of the slot in the clip collar but wider than the outer walled portion thereof.

2. An end clip assembly for clamping tubular stereotype plates having beveled ends on plate cylinders having reduced end portions overlapped by the beveled ends of the said plates, comprising a clip collar on the reduced portion underlying the beveled end of the plate and secured to the cylinder, said clip collar having a series of spaced longitudinally extending slots in its periphery having a pair of oppositely located, sidewise extending, recesses in the upper portion of same, and undercut enlargements adjacent their lower ends; slides in the respective slots of cross-sectional shapes corresponding with those of the slots; means for simultaneously shifting the slides in the slots; plate clips in the slots pivotally connected to the inner ends of their related slides and having plate engaging lugs adapted in one position to engage the beveled edge of the plate and in another position to be retracted within the slots and recesses; said clips having cam slots in their sides shaped to project the clips when shifted towards the plate and to retract the clips when shifted away from the plate; and pins extending from the walls of the clip receiving slots and entering their related slots in the clips.

3. In an assembly as set forth in claim 2, said clip collar having a bore receiving the reduced portion of the cylinder and having an external diameter forming a continuation of the main body of the said cylinder.

4. In an assembly as set forth in claim 2, each slot in the clip collar having an outer parallel walled portion, and having an inner parallel walled portion of greater width than the outer portion, and having an intermediate parallel walled portion of greater width than that of the inner portion.

5. In an assembly as set forth in claim 2, each slide having its inner end reduced in width and provided with a transverse bore for receiving a pivot pin connecting the related clip thereto; the outer face of each slide substantially conforming with the curvature of the periphery of the clip collar.

6. In an assembly as set forth in claim 2, each slot in the clip collar having an outer parallel walled portion with a pair of oppositely located, sidewise extending, recesses in the upper portion of same, and having an inner parallel walled portion of greater width than the outer portion, and having an intermediate parallel walled portion of greater width than that of the inner portion; each slide having its inner end reduced in width and provided with a transverse bore; and each clip being of less height than the depth of the slot and having spaced perforated ears at its outer end stradding the reduced end of the related slide, a pivot pin passing through said ears and the bore of the slide, the plate engaging lug thereof being wider than the outer walled portion of the slot in the clip collar but of less width than said sidewise extending recesses in the upper portion of same and into which the ends of said lug are adapted to be completely retracted, said lug having an arcuate inner edge conforming with the curvature of the plate, the lower portion of the clip being of less width than the inner walled portion of the slot in the clip collar but wider than the outer walled portion thereof.

7. In an assembly as set forth in claim 2, said slide shifting means comprising a shift collar on the reduced portion having bores adjacent its periphery opposite each of the slides in the clip collar, said bores having inner and outer end enlargements; bolts in said bores threaded into their related slides, said bolts having heads housed within the outer enlargements of the bores; nuts on the bolts adjacent the inner enlargements of the bores; spiral springs within the inner enlargements of the bores having their ends engaging the inner ends of the inner enlargements and said nuts; said springs normally urging the bolts towards the clip collars; means for locking the bolts and nuts against rotation; and means for shifting the shift collar.

8. In an assembly as set forth in claim 2, said slide shifting means comprising a shift collar on the reduced portion of the cylinder; bolts yieldably carried by the shift collar and connected with their related slides; said shift collar having external diametrically opposed cam shoes mounted for parallel crosswise slidable movement thereon; a cam shaft extending through said shift collar, cam shoes, and through a diametrically disposed bore in said reduced portion of the cylinder, and having eccentrically disposed heads thereon engaging recesses in the cam shoes; and means for rotating the shaft.

9. An end clip assembly for clamping tubular stereotype plates having beveled ends on plate cylinders having reduced end portions overlapped by the beveled ends of the said plates, comprising a fixed spacing collar on the reduced end underlying and overlapped by the plate; a fixed clip collar on the reduced portion underlying the beveled end of the plate, said clip collar having a series of spaced longitudinally extending slots in its periphery having a pair of oppositely located, sidewise extending, recesses in the upper portion of same, and undercut enlargements adjacent their lower ends; slides in the respective slots of cross-sectional shapes corresponding with those of the slots; means for simultaneously shifting the slides in the slots; plate clips in the slots pivotally connected to the inner ends of their related slides and having plate engaging lugs adapted in one position to engage the beveled edge of the plate and in another position to be retracted within the slots and recesses, said clips having cam slots in their sides shaped to project the clips when shifted towards the plate and to retract the clips when shifted away from the plate; and pins extending from the walls of the clip receiving slots and entering their related cam slots in the clips.

10. In an assembly as set forth in claim 9, said spacing collar and clip collar each having a bore slidably engaging the reduced portion of the cylinder and having an external diameter forming a continuation of the main body of the said cylinder; means for locking the spacing collar to the cylinder; and means for locking the clip collar to the spacing collar.

11. In an assembly as set forth in claim 9, each slot in the clip collar having an outer parallel walled portion, and having an inner parallel walled portion of greater width than the outer portion, and having an intermediate parallel walled portion of greater width than that of the inner portion.

12. In an assembly as set forth in claim 9, each slide having its inner end reduced in width and provided with a transverse bore for receiving a pivot pin connecting the related clip thereto; the outer face of each slide conforming substantially with the curvature of the periphery of the clip collar.

13. In an assembly as set forth in claim 9, each slot in the clip collar having an outer parallel walled portion, and having an inner parallel walled portion of greater width than the outer portion, and having an intermediate parallel walled portion of greater width than that of the inner portion; each slide having its inner end reduced in width and provided with a transverse bore; and each clip being of less height than the depth of the slot and having spaced perforated ears at its outer end straddling the reduced end of the related slide, a pivot pin passing through said ears and the bore of the slide, the plate engaging lug thereof being wider than the outer walled portion of the slot in the clip collar but of less width than said sidewise extending recesses in the upper portion of same and into which the ends of said lug are adapted to be completely retracted, said lug having an arcuate inner edge conforming with the curvature of the plate, the lower portion of the clip being of less width than the inner walled portion of the slot in the clip collar but wider than the outer walled portion thereof; and said cam slot having an outer end portion disposed parallel with the axis of the cylinder when the clip is projected into plate engaging position, and having an outwardly inclined inner end portion.

14. In an assembly as set forth in claim 9, each pin comprising an Allen set screw having a threaded outer end screwed into a tapped bore in the clip collar disposed at right angles to the walls of the outer portion of the slot of the clip collar, the inner end of the set screw being plain and engaging the cam slot in the related clip, the entrance to the bore in the clip collar being cut away to permit insertion and removal of the set screw.

15. In an assembly as set forth in claim 9, said slide shifting means comprising a shift collar on the reduced portion of the cylinder, said shift collar having bores adjacent its periphery opposite each of the slides in the clip collar, said bores having inner and outer end enlargements; bolts in said bores threaded into their related slides, said bolts having heads housed within the outer enlargements of the bores; nuts on the bolts adjacent the inner enlargements of the bores; spiral springs within the inner enlargements of the bores having their ends engaging the inner ends of the inner enlargements and said nuts, said springs normally urging the bolts towards the clip collars; and means for shifting the shift collar.

16. In an assembly as set forth in claim 9, said slide shifting means comprising a shift collar on the reduced portion of the cylinder; bolts yieldably carried by the shift collar and connected with their related slides; said shift collar having external diametrically opposed cam shoes mounted for parallel crosswise slidable movement thereon; a cam shaft extending through said shift collar, cam shoes, and through a diametrically disposed bore in said reduced portion of the cylinder, and having eccentrically disposed heads thereon engaging recesses in the cam shoes; and means for rotating the shaft.

EARL P. LACURE.

REFERENCES CITED

The following references are of record in the file of this patent:

UNITED STATES PATENTS

| Number | Name | Date |
| --- | --- | --- |
| 1,336,721 | Bechman | Apr. 13, 1920 |
| 2,190,385 | Ross | Feb. 13, 1940 |
| 2,236,146 | Lacure et al. | Mar. 25, 1941 |